(12) United States Patent
Qiu et al.

(10) Patent No.: US 10,224,526 B2
(45) Date of Patent: Mar. 5, 2019

(54) BATTERY USED FOR UNMANNED AERIAL VEHICLE AND AN UNMANNED AERIAL VEHICLE

(71) Applicant: AUTEL ROBOTICS USA LLC, Bothell, WA (US)

(72) Inventors: Longxue Qiu, Guangdong (CN); Xingwen Wu, Guangdong (CN)

(73) Assignee: AUTEL ROBOTICS USA LLC, Bothell, WA (US)

( * ) Notice: Subject to any disclaimer, the term of this patent is extended or adjusted under 35 U.S.C. 154(b) by 0 days.

(21) Appl. No.: 15/598,914

(22) Filed: May 18, 2017

(65) Prior Publication Data

US 2017/0256763 A1 Sep. 7, 2017

Related U.S. Application Data

(63) Continuation-in-part of application No. PCT/CN2016/103265, filed on Oct. 25, 2016.

(30) Foreign Application Priority Data

Dec. 14, 2015 (CN) .................... 2015 2 1037540 U

(51) Int. Cl.
*B64C 39/00* (2006.01)
*H01M 2/10* (2006.01)
*B64C 39/02* (2006.01)

(52) U.S. Cl.
CPC ......... *H01M 2/1083* (2013.01); *B64C 39/024* (2013.01); *B64C 2201/042* (2013.01); *B64C 2201/06* (2013.01); *H01M 2220/20* (2013.01)

(58) Field of Classification Search
CPC ............ H01M 2/1083; H01M 2220/20; B64C 2201/06; B64C 39/024
See application file for complete search history.

(56) References Cited

U.S. PATENT DOCUMENTS 5,589,288 A 12/1996 Coulson et al.
5,769,657 A 6/1998 Kondo et al.
(Continued)

FOREIGN PATENT DOCUMENTS

CN 2451270 Y 10/2001
CN 1750416 A 3/2006
(Continued)

OTHER PUBLICATIONS

Opinions of the Patent Evaluation Report; Patent No. ZL2015210375403 filed on Dec. 14, 2015.
(Continued)

*Primary Examiner* — Cynthia H Kelly
*Assistant Examiner* — Monique M Wills
(74) *Attorney, Agent, or Firm* — Ladas & Parry LLP

(57) ABSTRACT

The present invention discloses an unmanned aerial vehicle and a battery thereof. The battery includes a battery body and a shell disposed on one end of the battery body. The shell has a clamp button disposed on the side opposite the unmanned aerial vehicle. One end of the clamp button is fixed on the shell and the other is used for detachably connecting with the unmanned aerial vehicle. The clamp button makes the battery detachably connect with the main body of the unmanned aerial vehicle be possible and it is very convenient for changing the battery.

8 Claims, 3 Drawing Sheets

(56) References Cited

U.S. PATENT DOCUMENTS

| | | | |
|---|---|---|---|
| 5,869,204 | A | 2/1999 | Kottke et al. |
| 6,136,467 | A | 10/2000 | Phelps, III et al. |
| 6,371,535 | B2 | 4/2002 | Wei et al. |
| 6,623,049 | B2 | 9/2003 | Shreeve et al. |
| 6,660,427 | B1 | 12/2003 | Hukill et al. |
| 6,729,413 | B2 | 5/2004 | Turner et al. |
| 6,876,173 | B2 | 4/2005 | Mastaler et al. |
| 7,989,969 | B2 | 8/2011 | Grant et al. |
| 8,534,717 | B2 | 9/2013 | Whetten et al. |
| 8,973,861 | B2 | 3/2015 | Zhou et al. |
| D740,222 | S | 10/2015 | Tang |
| 2002/0125857 | A1 | 9/2002 | Mastaler et al. |
| 2003/0039880 | A1* | 2/2003 | Turner ............... H01M 2/1022 429/97 |
| 2007/0012818 | A1* | 1/2007 | Miyazawa ............ A63H 27/12 244/17.25 |
| 2008/0241675 | A1 | 10/2008 | Enari et al. |
| 2008/0268329 | A1 | 10/2008 | Mackle et al. |
| 2013/0031762 | A1* | 2/2013 | Chellew .................. B25F 5/02 29/426.5 |
| 2013/0224528 | A1 | 8/2013 | Johnson et al. |
| 2015/0158392 | A1 | 6/2015 | Zhao |
| 2015/0314434 | A1 | 11/2015 | Bevins, Jr. et al. |
| 2016/0039300 | A1* | 2/2016 | Wang ................ B60L 11/1822 244/39 |
| 2016/0130015 | A1 | 5/2016 | Caubel et al. |
| 2016/0179096 | A1 | 6/2016 | Bradlow et al. |
| 2017/0001721 | A1 | 1/2017 | Saika et al. |
| 2018/0076431 | A1 | 3/2018 | Qiu et al. |

FOREIGN PATENT DOCUMENTS

| | | |
|---|---|---|
| CN | 101472413 A | 7/2009 |
| CN | 201528005 U | 7/2010 |
| CN | 201728641 U | 2/2011 |
| CN | 204144349 U | 2/2015 |
| CN | 204223172 U | 3/2015 |
| CN | 204230318 U | 3/2015 |
| CN | 204230319 U | 3/2015 |
| CN | 104505477 A | 4/2015 |
| CN | 204415738 U | 6/2015 |
| CN | 204596856 U | 8/2015 |
| CN | 204614830 U | 9/2015 |
| CN | 204651359 U | 9/2015 |
| CN | 20500377 U | 1/2016 |
| CN | 204966559 U | 1/2016 |
| CN | 205159402 U | 4/2016 |
| CN | 205376593 U | 7/2016 |
| CN | 205645917 U | 10/2016 |
| CN | 206077007 U | 4/2017 |
| CN | 106031318 B | 9/2017 |
| CN | 206719560 U | 12/2017 |
| JP | 2007-123082 A | 5/2007 |
| JP | 2008-066144 A | 3/2008 |
| JP | 2013-226855 A | 11/2013 |
| WO | 2015/179797 A1 | 11/2015 |
| WO | 2017/204592 A1 | 11/2017 |

OTHER PUBLICATIONS

International Search Report and Written Opinion dated Jan. 23, 2017 PCT/CN2016/103265.

DJI-1041 http://www.dji.com/product/phantom-2-vision=plus/download, archived Nov. 19, 2015, 2 pages.

DJI-1042 Mar. 3, 2015 press release "DJI has released the new firmware v.3.08 for Phantom 2 series quadcopter", archived Mar. 5, 2015, 2 pages.

DJI-1043 "DJI hantom 2 Vision+ Review, Buttery Smooth Quadcopter Video", http://gizmodo.com/dji-phantom-2-vision-review-buttery-smooth-quadcopter-1559567158, archived Apr. 10, 2014; 6 pages.

DJI-1044 "DJI Phantom 2 Vision Plus Review", Quadcopter HQ, Apr. 14, 2014, archived Nov. 23, 2014 with link to User Manual on dji.com, 6 pages.

DJI-1045 "DJI Phantom 2 Vision+ review: Top-notch eye in the sky", CNET, Oct. 14, 2014, 4 pages.

DJI-1046 DJI Phantom 2 Vision Plus + First Look and Review & Rating, DroneFlyers, Jul. 4, 2014, 7 pages.

DJI-1047 "Phantom 2 Vision Plus-Initial Unboxing", RC Geeks Blog, available at www.rcgeeks.co.ukblogphantom-2-vision-plus-initial-unboxing. 7 pages.

U.S. Appl. No. 62/187,205, filed Jun. 30, 2015.

Remote Controller Design Guide, 30 pages, DJIATL0452865-DJIATL0452894.

DJI Vision App Design Guide, 21 pages, DJIATL0452895-DJIATL0452915.

BACL FCC Part 15.247 Test Report; FCC ID: WQ8301AC58A1, 62 pages, DJIATL0453290-DJIATL0453351.

Letter from Autel ITC to FCC; dated Mar. 11, 2015; Confidentiality Request regarding application for certification of FCC ID: WQ8301AC58A1, 1 page; DJIATL0453252.

Letter from 3DR to FCC dated Apr. 28, 2015; Request for Permanent Confidentiality, 1 page, DJIATL0451887.

Autel, Maxaero, X-Memo, X-Star Manual, 95 pages, DJIATL0453352-DJIATL0453446.

FCC ID WQ8301AC58A1 X-Star 3, Aug. 20, 2018; 4 pages, DJIATL0453248-DJIATL0453251.

Phantom 2 Vision + User Manual, Feb. 14, 2014 Revised, 30 pages, DJIATL0452835-DJIATL0452864.

Phantom 4 Unboxing a Detailed First Look; Apr. 5, 2016, 36 pages, DJIATL0452489-DJIATL0452524.

Solo Operation Manual 3DR, 40 pages, DJIATL0451893-DJIATL0451932.

T1000 with OPS, Hexa-copter manual versionV0.1, Nov. 10, 2012, 27 pages, DJIATL0452567-DJIATL0452593.

Third-Party Preissuance Submission Per 37. C.F.R. 1.290 U.S. Appl. No. 15/812,773, filed Nov. 14, 2017.

Third-Party Preissuance Submission Per 37. C.F.R. 1.290, U.S. Appl. No. 15/812,805, filed Nov. 14, 2017.

Third-Party Preissuance Submission Per 37. C.F.R. 1.290, U.S. Appl. No. 15/812,860, filed Nov. 14, 2017.

In United States District Court for the District of Delaware C.A. No. 16-706-LPS-CJB (Consolidated) Counterclaim Defendants' Initial Invalidity Contentions Respecting U.S. Pat. No. 9,979,000.

Prior Art (Photos).

DJI-1036 Phantom 2 Vision+ product download page, (archived Jan. 20, 2015) http://www.dji.com/product/phantom-2-vision-plus/download, 3 pages.

DJI-1037 Phantom 2 Vision+ User Manual (EN) version 1.8, available Jan. 30, 2015, 52 pages.

DJI-1038 Phantom 2 Vision+ product download page (archived Feb. 7, 2015) http://www.dji.com/product/phantom-2-vision-plus/download), 2 pages.

DJI-1039 http://www.dji.com/product/phantom-2-vision-plus/download, archived Mar. 10, 2015, 2 pages.

DJI-1040 http://www.dji.com/product/phantom-2-vision-plus/download, archived Sep. 7, 2015, 2 pages.

Third-Party Preissuance Submission Per 37. C.F.R. 1.290 U.S. Appl. No. 15/812,836, filed Jun. 11, 2018.

DJI-1012 Safety of Lithium-Ion Batteries by The European Association for Advanced Rechargeable Batteries, Jun. 2013, 26 pages.

DJI-1021 Screenshot of the home page for the publicly-accessible DJI website (dji.com), available in Apr. 2014, (archived Apr. 13, 2014), 3 pages.

DJI-1022 Screenshot of the publicly-accessible Phantom 2 Vision+ product page (http://www.dji.com/product/phantom-2-vision-plus/) from Apr. 2014, (archived Apr. 2014), 3 pages.

DJI-1023 Screenshot of the publicly-accessible Phantom 2 Vision+ downloads page (Https://www.dji.com/phantom-2-vision-plus/downloads) from Apr. 2014 (archived Apr. 10, 2014), 2 pages.

DJI-1024 Screenshot of the publicly accessible Phantom 2 Visions+ User Manual Version 1.1.1 from Apr. 2014 (archived Apr. 11, 2014), 1 page.

DJI-1025 Phantom 2 Vision+ User Manual (EN) v.1.1.1, available Apr. 7, 2014, 74 pages.

(56) References Cited

OTHER PUBLICATIONS

DJI-1026 Apr. 7, 2014 press release "DJI has released its new ready to fly quadcopter, the Phantom 2 Vision+", (archived Apr. 15, 2014), 2 pages.
DJI-1027 Phantom 2 Vision+ User Manual (EN) v.1.2, available Jun. 26, 2014, 2 pages.
DJI-1028 Phantom 2 Vision+ product download page, (archived Jun. 26, 2014) http://www.dji.com/product/phantom-2-vision-plus/download, 2 pages.
DJI-1029 Phantom 2 Vision+ Use Manual (EN) v.1.4, available Aug. 15, 2014, 52 pages.
DJI-1030 Phantom 2 Vision+ download page, (archived Oct. 14, 2014) http://www.dji.com/product/phantom-2-vision-plus/download, 2 pages.
DJI-1031 Phantom 2 Vision+ download page, (archived Oct. 20, 2014) http://www.dji.com/product/phantom-2-vision-plus/download, 2 pages.
DJI-1032 Phantom 2 firmware press release dated Oct. 27, 2014 (archived Oct. 31, 2014), 2 pages.
DJI-1033 Phantom 2 Vision+ User Manual (EN) version 1.6, available Nov. 12, 2014, 52 pages.
DJI-1034 Phantom 2 Vision+ product download page (archived Nov. 14, 2014) http://wwww.dji.com/product/phantom-2-vision-plus/downlaod, 2 pages.
DJI-1035 Phantom 2 Vision+ product download page, (archived Dec. 29, 2014) http://www.dji.com/product/phantom-2-vision-plus/download, 2 pages.

* cited by examiner

BATTERY USED FOR UNMANNED AERIAL VEHICLE AND AN UNMANNED AERIAL VEHICLE

CROSS-REFERENCE

This application is a continuation-in-part of International Application No. PCT/CN2016/103265 filed on Oct. 25, 2016, which claims priority to Chinese Application No. CN201521037540.3 filed on Dec. 14, 2015, both of which are hereby incorporated by reference in their entirety.

TECHNICAL FIELD

The present invention relates to unmanned aerial vehicle field, more particularly, relates to a battery used for unmanned aerial vehicle and an unmanned aerial vehicle.

BACKGROUND

With the development of the science and technology and the requirement of national economic development, an unmanned aerial vehicle which is used to be military used has been frequently used in civilian market. In civilian market, the unmanned aerial vehicle could be used for power line inspection, mapping, traffic security, advertising celebration and so on which has a huge civilian market and wide space of development. The unmanned aerial vehicle for civilian use is generally controlled and set by a wireless remote controller or a ground station. During flight, the unmanned aerial vehicle transmits the flight data or videos or other information to the ground station by which the flight status and other information of the unmanned aerial vehicle could be informed.

In prior arts, a main body of the unmanned aerial vehicle offers a cavity for accommodating the power of the unmanned aerial vehicle, such as a lithium battery. Generally, for preventing the battery dropping from the cavity during flight of the unmanned aerial vehicle, a sealing board for fastening the battery is set in an opening of the cavity. The sealing board is usually fixed to the main body of the unmanned aerial vehicle by screws, bolts or other fasteners. The screws or bolts need to be loosen before changing the battery, and after changing the battery, the screws or bolts need to be fastened. In this way, it is inconvenient for changing the battery.

SUMMARY

Therefore, a technical problem the present invention aims at solving is that overcoming the defect that the inconvenient of changing the battery used for the unmanned aerial vehicle.

According to a first aspect, an embodiment of this invention discloses a battery used for unmanned aerial vehicle, comprising:

A battery body and a shell disposed on one end of the battery body, a clamp button is disposed on a side of the shell opposite the unmanned aerial vehicle. One end of the clamp button being fixed on the shell, and the other end being used for detachably connecting with the unmanned aerial vehicle.

Further, the end of the clamp button used for detachably connecting with the unmanned aerial vehicle has a hook for detachably hanging on the unmanned aerial vehicle; a groove is formed between the hook and a body of the clamp button.

Further, an anti-slip structure is configured on an outer surface between the end of the clamp button and the other end of the clamp button.

Preferably, the anti-slip structure is a wave shape convex structure.

The battery further comprises a restorable elastic piece disposed on an inner side of the clamp button.

Further, one end of the restorable elastic piece is disposed on the shell, and the other end of the restorable elastic piece contacts the clamp button.

Further, the restorable elastic piece is mirror symmetric and has an S-shape, one end of the restorable piece clips to the shell and an arc surface of the other end abuts against a lower surface of the clamp button.

Preferably, the number of the clamp button is at least two, the at least two clamp buttons are respectively disposed on an upper and lower ends of a side of shell that opposite the unmanned aerial vehicle.

According to the second aspect, an embodiment of the present invention discloses an unmanned aerial vehicle, comprising:

An unmanned aerial vehicle main body, the unmanned aerial vehicle main body is configured an unmanned aerial vehicle battery compartment, an end face of an opening of the unmanned aerial vehicle battery compartment contacting the shell of the unmanned aerial vehicle battery is configured a clamping portion detachably connecting with the clamp button.

Further, the surface of the clamping portion contacting the clamp button has a clasper.

Further, the clamping portion is disposed on an outer surface of the opening of the battery compartment.

Further, the number of the clamping portion is at least two, and the at least two clamps are disposed on opposite sides of the opening of the battery compartment respectively.

Further, the unmanned aerial vehicle further comprises any one of the batteries described above.

The technical proposal of this application has following advantages:

According to the unmanned aerial vehicle and battery thereof provided in the embodiments of the present invention, because a clamp button is configured on one end of the shell, the battery is capable of detachably connecting with the main body of the unmanned aerial vehicle which makes the changing of the battery be more convenient.

As a preferable technical proposal, the inner side of the clamp button is configured a restorable elastic piece for realizing the clamp button returning back to original place automatically.

BRIEF DESCRIPTION OF THE DRAWINGS

Many aspects of the embodiments or related arts can be better understood with reference to the following drawings. Obviously, the following drawings are some of embodiments of the present invention. The person having ordinary skill in the art can obtain other drawings according to the following drawings on the premise of no creative work being paid.

DESCRIPTION OF THE EMBODIMENTS

The technical solution in the present invention will herein after be described clearly with the drawings. Obviously, the embodiments described below are some of all the possible embodiments of the present invention, not all the embodiments of the present invention. Based on the embodiments described below, the embodiments obtained by a person having ordinary skill in the art with no creative work are belong to the present invention.

In the following description of the present invention, unless there is an another expressly definition, the term "install", "connected" or "connecting" should be understood in a broad sense, for example, it could be interpreted as fixed connection or detachable connection, even integral connection. It also could be interpreted as direct connection or indirect connection. The person having ordinary skill in the art could understand specific meanings of the above terms in the present invention according to specific circumstance.

Moreover, the technical features involved in different embodiments described below in the present invention can be combined as long as there is no conflict between each other.

Embodiment 1

Figure 1:
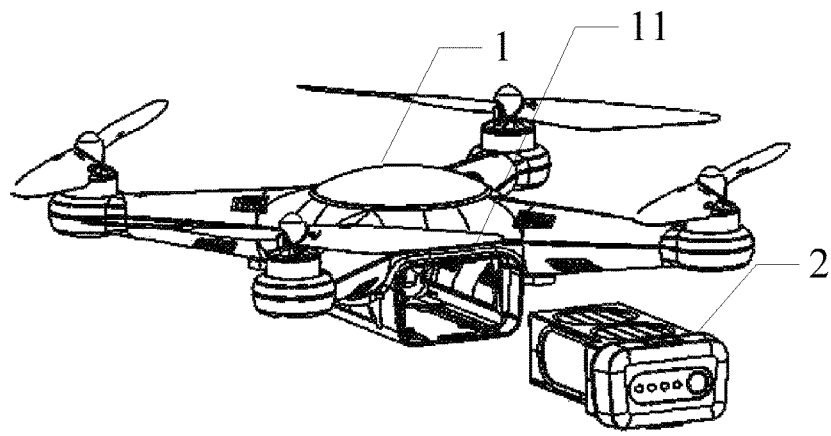
FIG. 1 is a disassembled structure diagram of an unmanned aerial vehicle in an embodiment of the present invention.

FIG. 1 is a structure diagram of an unmanned aerial vehicle in this embodiment. The unmanned aerial vehicle includes an unmanned aerial vehicle main body 1 and an unmanned aerial vehicle battery 2.

Figure 2:
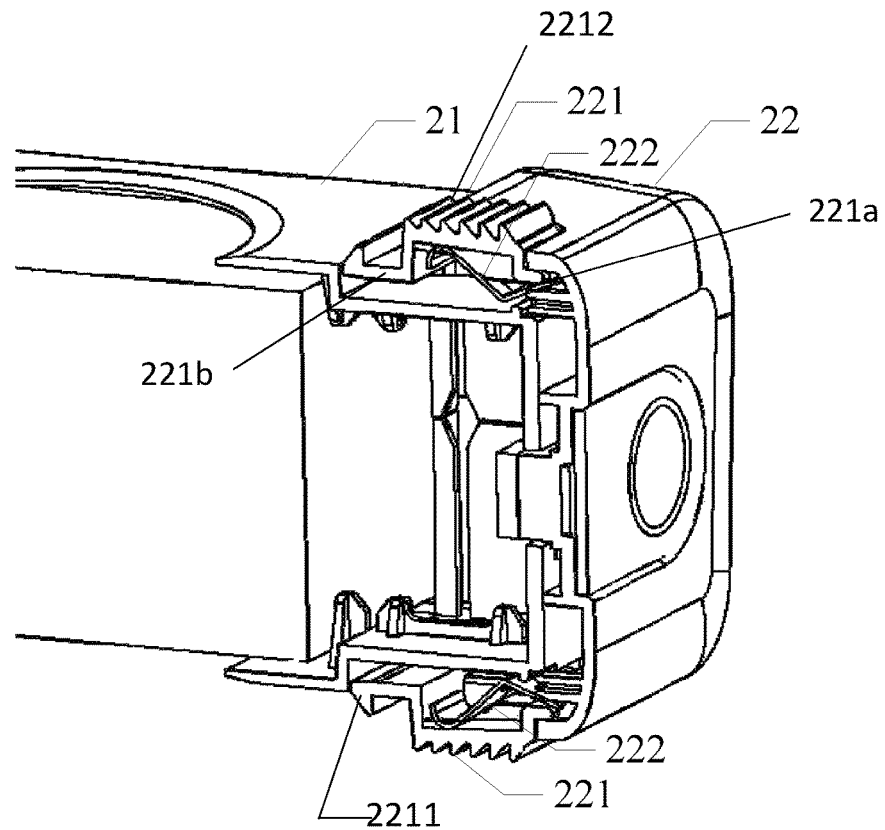
FIG. 2 is a structure diagram of a battery used for an unmanned aerial vehicle in an embodiment of the present invention.
Figure 3:
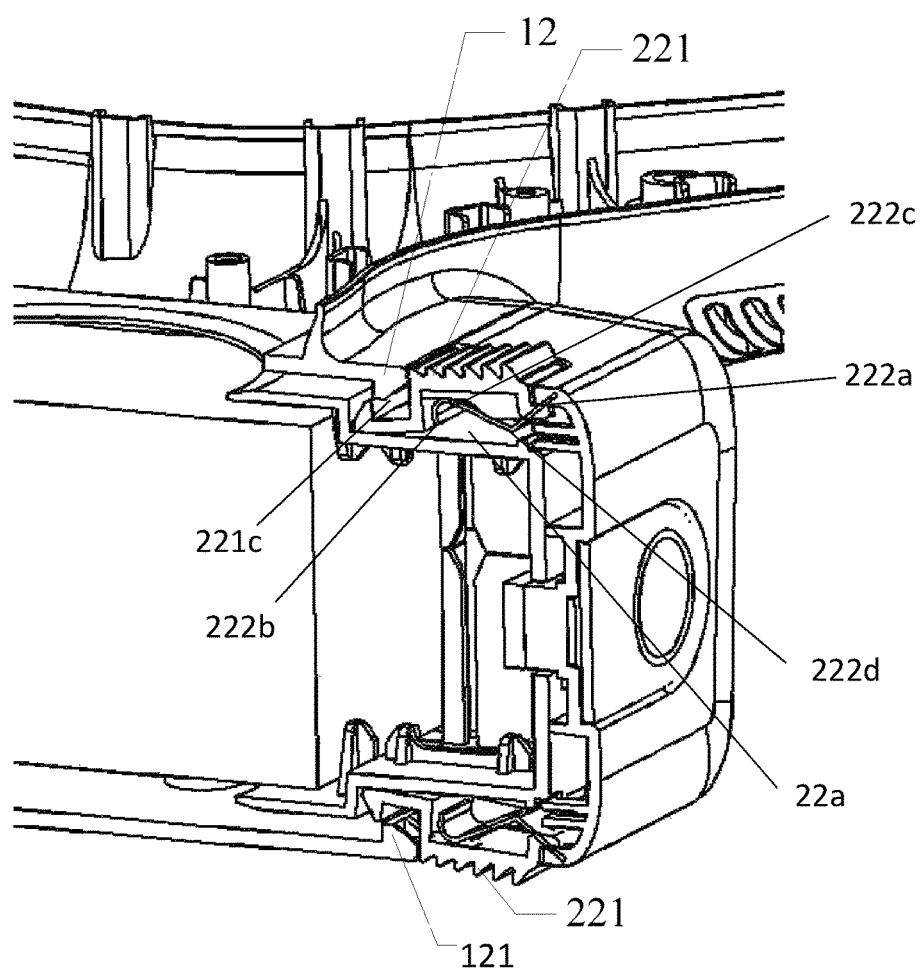
FIG. 3 is a state illustration of connecting a battery used for an unmanned aerial vehicle with a main body of the unmanned aerial vehicle in an embodiment of the present invention.

A battery used for an unmanned aerial vehicle is disclosed in this embodiment for realizing the detachable connection between the unmanned aerial vehicle battery 2 and the main body 1 of the unmanned aerial vehicle which is convenient for the changing of the battery. Referring to FIG. 2, the battery 2 used for the unmanned aerial vehicle includes a battery body 21 and a shell 22 disposed on one end of the battery body 21. A clamp button 221 is configured on a side of the shell 22 opposite the unmanned aerial vehicle. One end 221a of the clamp button 221 is fixed to the shell 22 and the other end 221b of the clamp button 221 is used for detachably connecting to the unmanned aerial vehicle. In the preferable embodiment, the end 221b of the clamp button 221 that is used for detachably connecting to the unmanned aerial vehicle has a hook 2211 for detachably hanging on the unmanned aerial vehicle. Referring to FIG. 3, a groove 221c is formed between the hook 2211 and the body of the clamp button 221 for preventing the body of the clamp button from mechanical interfering with the unmanned aerial vehicle. In specific embodiment, the number of the clamp button 221 is at least two. The at least two clamps buttons 221 are disposed on the upper and lower ends of one side of the shell 22 opposite the unmanned aerial vehicle respectively. In preferable embodiment, an anti-slip structure 2212 is configured on an outer surface between one end 221a of the clamp button 221 and the other end 221b of the clamp button 221 for increasing the touching friction of the clamp button 221 and preventing slipping when users are touching the clamp button 221. The anti-slip structure 2212 is a wave shape convex structure.

In preferable embodiment, the battery 2 used for the unmanned aerial vehicle further includes a restorable elastic piece 222 for realizing the clamp button 221 returning to original position automatically. Referring to FIG. 3, the restorable elastic piece 222 is disposed on an inner side of the clamp button 221. One end 222a of the restorable elastic piece 222 connects to the shell 22 and the other end 222b of the restorable elastic piece 222 contacts the clamp button 221. Specifically, the other end 222b of the restorable elastic piece 222 abuts against the clamp button 221.

In some embodiments, the end 222a of the restorable elastic piece 222 can be disposed on the shell 22 and abuts against the shell 22, the other end of the restorable elastic piece 222b contacts the clamp button 221 and is fixed with the clamp button 221. In other embodiments, the end 222a of the restorable elastic piece 222 can be fixed with the shell 22 and the other end 222b can be abut against the clamp button 221.

Referring to FIG. 3, in some embodiments, the end 222a also can be formed by the portion extending from a bending portion 222d to the end that the label "222a" points to. Therefore, the bending portion 222d of the end 222a can be fixed with a plate 22a of the shell 22 and the other end 222b abuts against the clamp button 221. In other embodiments, the bending portion 222d of the end 222a abuts against the plate 22a of the shell 22 and the other end 222b is fixed with the clamp button 221.

In preferable embodiment, the restorable elastic pieces 222 are mirror symmetric and have an S-shape for better stuck in the inner side of the clamp button 221. One end 222a of the restorable elastic piece 222 is stuck in the shell 22, for example, the end 222a of the restorable elastic piece 222 which stuck in the shell can be pressed by the end 221a of the clamp button 221 which contacts this end; an arc surface 222c of the other end 222b of the restorable elastic piece 222 contacts the lower surface of the clamp button 221 which makes the restorable elastic piece 222 better provide a driving force of returning to original place to the clamp button 221.

The unmanned aerial vehicle battery disclosed in this embodiment, because of the clamping button 221 configured on the upper and lower ends of the shell 22, the clamp button 221 can be pressed down and moved inwards and is capable of returning to the original place automatically under the function of the restorable elastic piece 222 after hands are loosen. Therefore, realizing the detachably connection between the unmanned aerial vehicle battery and the main body of the unmanned aerial vehicle which is convenient for the changing of the battery.

Embodiment 2

FIG. 1 is an unmanned aerial vehicle disclosed in this embodiment, including a main body 1 of the unmanned aerial vehicle, the main body 1 of the unmanned aerial vehicle has a unmanned aerial battery compartment 11 configured thereon. Referring to FIG. 3, the end face of the opening of the battery compartment 11 contacting the shell of the unmanned aerial vehicle battery has a clamping portion 12 detachably connecting with the clamp button 221. In specific embodiment, the clamping portion 12 may be disposed on an outer surface of the opening. In preferable embodiment, a clasper 121 is configured on the surface of the clamping portion 12 contacting the clamp button 221.

Specifically, the clasper 121 crooks inwards the opening and matches with the hook 2211 of the clamp button 221 for realizing a better connection between the clamp button 221 and the main body of the unmanned aerial vehicle. Preferably, the number of the clamping portion 12 is at least two and the at least two clamping portion 12 are disposed on opposite sides of the opening respectively. Specifically, the position of the clamping portion 12 should match with that of the clamp button 222 when the clamp buttons 222 are connecting with the main body 1 of the unmanned aerial vehicle.

Figure 4:
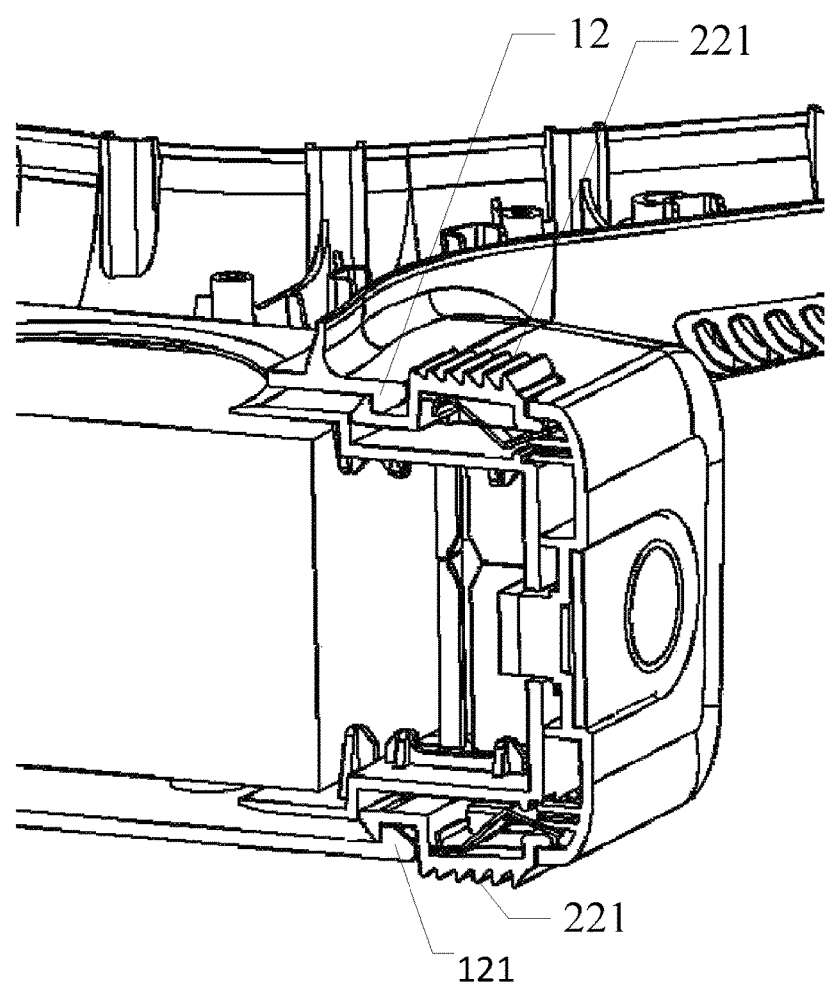
FIG. 4 is another state illustration of connecting the battery used for the unmanned aerial vehicle with the main body of the unmanned aerial vehicle in an embodiment of the present invention.

In specific embodiment, when install the unmanned aerial vehicle battery 2 to the main body 1 of the unmanned aerial vehicle, put the battery 2 on the opening of the battery compartment 11 and push the battery 2 into the battery compartment 11, and the clamp buttons 221 will press down the restorable elastic pieces 222 under the extrusion of the upper and lower clamping portion 12 of the battery compartment 11, the battery 2 will be pushed into the battery compartment 11, referring to FIG. 3. Meanwhile, when the clamp button 221 is totally pushed in, the restorable elastic piece 222 will automatically rebound so that making the clamp button 221 return back to its original place, referring to FIG. 4, and the unmanned aerial vehicle battery 2 will be stuck tightly by the upper and lower clamping portions 12 on the opening of the battery compartment 11. Similarly, when need to remove the unmanned aerial vehicle battery 2, press down the clamp buttons 221 upwards and downwards and pull out the battery at the same time, the battery will be pulled out.

Apparently, embodiments described above are only for illustrating the present invention clearly, not intent to limit the present invention. For a person having ordinary skill, various changes and alterations can be made based on above embodiments. It's no need to give all the embodiments and there are also too numerous to give, the obvious changes and alterations all belong to the scope of protection required by the present invention.

What is claimed is:

1. A multi-rotor unmanned aerial vehicle, comprising:
    an unmanned aerial vehicle main body comprising a battery compartment;
    four arms, wherein each arm is coupled to the main body;
    a propulsion assembly disposed on the each arm, wherein the propulsion assembly comprises a propeller and a motor, the motor being configured to drive the propeller to rotate in order to generate lift force;
    a battery capable of being accommodated in the battery compartment, the battery comprising a shell and a battery body substantially disposed in the shell;
    a clamp button disposed on the shell, wherein a first end of the clamp button is mounted directly or indirectly to the shell and a second end of the clamp button is used for detachably connecting to the unmanned aerial vehicle; the second end of the clamp button being configured with a hook detachably hanging on the unmanned aerial vehicle; and
    a restorable elastic piece, wherein a first end of the restorable elastic piece is coupled to the shell and a second end of the restorable elastic piece contacts the clamp button;
    wherein the battery compartment comprises a clamping portion configured to detachably connect to the clamp button.

2. The multi-rotor unmanned aerial vehicle according to claim 1, wherein an anti-slip structure is configured on an outer surface between the first end of the clamp button and the second end of the clamp button.

3. The multi-rotor unmanned aerial vehicle according to claim 2, wherein the anti-slip structure is a wave shape convex structure.

4. The multi-rotor unmanned aerial vehicle according to claim 1, wherein the second end of the restorable elastic piece is fixed with the clamp button.

5. The multi-rotor unmanned aerial vehicle according to claim 4, wherein the first end of the restorable elastic piece is disposed on the shell and abuts against the shell.

6. The multi-rotor unmanned aerial vehicle according to claim 1, comprising at least two restorable elastic pieces, the at least two restorable elastic pieces being mirror symmetric and have an S-shape, the first end of the restorable elastic piece being stuck in the shell.

7. The multi-rotor unmanned aerial vehicle according to claim 1, wherein the number of the clamp button is at least two, the at least two clamp buttons being configured on an opposite side of the shell.

8. The multi-rotor unmanned aerial vehicle according to claim 1, wherein the number of the clamping portion is at least two, the at least two clamping portion being disposed on opposite sides of an opening of the battery compartment.

* * * * *